United States Patent [19]

van den Ouweland et al.

[11] 3,904,655

[45] Sept. 9, 1975

[54] PROCESS FOR THE PREPARATION OF A FLAVOR SUBSTANCE BY REACTING A 4-OXY-5-ALKYL-3-FURANONE WITH A HYDROGEN SULFIDE LIBERATING SUBSTANCE

[75] Inventors: Godefridus Antonius Maria van den Ouweland; Henricus Gerardus Peer, both of Zevenaar, Netherlands

[73] Assignee: Lever Brothers Company, New York, N.Y.

[22] Filed: Dec. 13, 1971

[21] Appl. No.: 207,671

Related U.S. Application Data

[62] Division of Ser. No. 836,968, June 26, 1969, Pat. No. 3,697,295.

[52] U.S. Cl. ........ 260/347.8; 260/345.9; 260/347.2

[51] Int. Cl. ............................................. C07d 5/10
[58] Field of Search ................................. 260/347.8

[56] References Cited

UNITED STATES PATENTS 3,651,097   3/1972   Van den Ouweland et al. 260/347.8

*Primary Examiner*—Henry R. Jiles
*Assistant Examiner*—Bernard I. Dentz

[57] ABSTRACT

A food flavour substance is prepared by reacting an heterocyclic ketone such as a furanone or a pyrone in the presence of water with hydrogen sulphide or a substance which is capable of giving rise to hydrogen sulphide.

4 Claims, No Drawings

PROCESS FOR THE PREPARATION OF A FLAVOR SUBSTANCE BY REACTING A 4-OXY-5-ALKYL-3-FURANONE WITH A HYDROGEN SULFIDE LIBERATING SUBSTANCE

This is a division of application Ser. No. 836,968 filed June 26, 1969 now U.S. Pat. 3,697,295.

The invention relates to the preparation of artificial flavouring substances and their use in the flavouring of foodstuffs. In particular, the invention is concerned with the preparation of substances capable of imparting a savoury flavour, for example a flavour resembling that of roast or fried meat, to foodstuffs. When the foodstuff is of a type which already has a savoury flavour, then such a flavour may be improved by judicial incorporation of these substances.

We have discovered that certain heterocyclic ketones are capable of reacting with certain organic or inorganic sulphur-containing compounds with the formation of a reaction mixture which has aroma and flavour characteristics remarkably similar to that of cooked meat.

Accordingly, the invention provides a process for the preparation of a flavouring substance in which process a heterocyclic ketone having the structure:

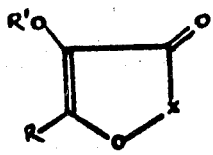

where $x$ is one of the groupings:
$>CH_2$, $>CHCH_3$, $>CHCH_2CH_3$, $>CHCH_2OH$,

and where R is an alkyl radical having from 1 to 4 carbon atoms, and where R' is hydrogen or an acyl radical having from 2 to 7 carbon atoms or an alkyl radical having from 1 to 4 carbon atoms, is reacted in the presence of water with hydrogen sulphide or other sulphur-containing compound which is capable of liberating hydrogen sulphide under the reaction conditions.

The ketones thus comprise a class of compounds which are substituted furanones or pyrones, especially those wherein the alkyl radical denoted by R in the above structural formula is a methyl, ethyl, n-propyl, isopropyl or n-butyl radical and wherein R' is hydrogen.

Although the radical R' is preferably hydrogen, we have found that certain organic radical substituents react in a similar manner to form flavouring substances according to the invention. Thus, for example, R' may alternatively be an acyl radical such as acetate, propionate, n-butyrate, iso-butyrate and benzoate, or an alkyl radical such as methyl, ethyl, n-propyl, iso-propyl and n-butyl.

Certain of these compounds show keto-enol tautomerization, but from analytical data including infra-red and nmr-spectra, it is believed that under normal conditions they are present in the enol form represented by the above structural formula.

Preferred examples of the furanones which may be reacted with hydrogen sulphide according to the invention are:

4-hydroxy-5-methyl-2,3-dihydrofuran-3-one
4-hydroxy-2,5-dimethyl-2,3-dihydrofuran-3-one
4-hydroxy-2-methyl-5-ethyl-2,3-dihydrofuran-3-one
4-hydroxy-5-methyl-2-ethyl-2,3-dihydrofuran-3-one
4-hydroxy-2,5-diethyl-2,3-dihydrofuran-3-one
4-hydroxy-2-hydroxymethyl-5-methyl-2,3-dihydrofuran-3-one
4-acetoxy-5-methyl-2,3-dihydrofuran-3-one
4-methoxy-2,5-dimethyl-2,3-dihydrofuran-3-one Of these furanones, the first three named examples are the most preferred.

The alkyl substituted furanones which are used according to the present invention can be prepared by heating and reacting a diketo diester of the general formula:

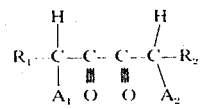

in which $R_1$ and $R_2$ represent a hydrogen atom or an alkyl radical containing 1 or 2 carbon atoms, with the provision that the number of carbon atoms of $R_1$ and $R_2$ together is at least one and $A_1$ and $A_2$ represent acid radicals. The acid radicals may be derived from carboxylic acids, especially from lower aliphatic carboxylic acids. Preferred ester groups are those derived from acetic and propionic acid.

The reaction is carried out in an aqueous acidic medium which contains at least 50 percent by volume, preferably at least 75 percent of water, the remainder being a water-miscible polar solvent as, for example a lower aliphatic alcohol such as methanol and ethanol.

The acidic compound available in the aqueous acidic medium may comprise an inorganic acid, a carboxylic acid, or, for example, an organic sulphonic acid. Suitable acids include hydrobromic or hydrochloric acid, sulphuric acid, phosphoric acid, formic acid, acetic acid, propionic acid, p-toluene sulphonic acid and the like. Polycarboxylic acids and hydroxycarboxylic acids are less suitable. The use of strong acids, showing a pH value below 5 or rather below 4, is particularly preferred.

The amount of acid in the aqueous medium is not particularly critical and may vary widely. Good results have been obtained with amounts of 0.1–5 equivalents of acid per litre medium. Also the concentration of the diketo diester in the aqueous medium may vary widely. Generally, less than 200g of diketo diester are dissolved per litre of medium. For practical reasons, in particular to reduce the volume of the reaction mixture, the use of too dilute solutions is avoided. A practical range is from 10 to 100g of diketo diester per litre medium.

The reaction temperature and time of reaction are related. For convenient reaction periods in the range of 0.5–10, preferably from 1 to 5 hours, it is preferred to conduct the reaction at temperatures above 75°C, preferably at boiling temperature at atmospheric pressure. It is however possible to obtain a satisfactory conversion at lower temperatures, for example of about 50°C, provided the reaction period is suitably adjusted to at least 20 hours.

After termination of the reaction the aqueous reaction mixture is allowed to cool and the desired furanone derivative is isolated in a conventional way. This could be done, for example, by extraction with ether, drying of the ethereal solution and evaporation of the solvent. Undesired polymeric contaminants are removed by distillation of the product under diminished pressure.

Esterification or etherification of the hydroxyl group in the 4-position may be achieved by conventional methods. The diketo diester starting materials for the process according to the invention can be prepared in various ways. A convenient method is via acetylenic compounds.

Step 1 - Preparation of an alkyne diol.

Acetylene was coupled with 2 moles of aldehyde using 2 moles of a Grignard compound. This method is described in Bull. Soc. Chim. - France 425 (1956). Alternatively a 1-alkyne-3-ol could be coupled with formaldehyde as described in Annalen 596,525 (1955) or by coupling a 1-alkyne-3-ol and other aldehydes or ketones (as described in Bull. Soc. Chim. supra).

Step 2 - Esterification of the alkyne diol.

The diacetates were conveniently prepared by reacting with acetic anhydride in the presence of e.g. pyridine or sodium acetate.

Step 3 - Oxidation of the alkyne diester

The alkyne diester was oxidized with dilute aqueous potassium permanganate at a low temperature yielding the diketo diester. This method has been described in Bull. Soc. Chim. (France) 759 (1949).

Preferred examples of the pyrones which may be reacted with hydrogen sulphide according to the invention are:

3-hydroxy-2-methyl-1,4-pyrone (maltol)
3-hydroxy-2-ethyl-1,4-pyrone (ethyl maltol)

The sulphur containing compound with which the furanone or pyrone is reacted is hydrogen sulphide, in the form of a gas, liquid or solution, or an organic or inorganic compound which is capable of liberating hydrogen sulphide, either in gaseous or nacent form, under the reaction conditions.

Suitable examples of organic sulphur-containing compounds are cysteine, or a peptide containing cysteine such as glutathione, cystine mercaptoacetamide, thioacetamide or salts, for example potassium or sodium salts, hydrochlorides, esters or other simple derivatives of these sulphur-containing compounds.

Suitable examples of inorganic sulphur-containing compounds are sulphides or hydrosulphides of alkali metals, alkaline earth metals or ammonia, such as sodium sulphide, potassium sulphide, ammonium sulphide, calcium sulphide or the corresponding hydrosulphides. Also, other inorganic metallic sulphides, for example ferrous sulphide, may be used.

The reaction mixture comprising at least one ketone and hydrogen sulphide or a sulphur-containing compound as herein defined which react to form the flavour substances according to the invention, may optionally also contain other ingredients which improve or enhance the character of the flavour which subsequently is produced. These optional ingredients may be added before, during or after the ketone and hydrogen sulphide or sulphur-containing compound react.

Thus it is possible to include in the reaction mixture amino acids, the preferred amino acids being one or more of the following: arginine, glutamic acid, proline, glycine, α-alanine, β-alanine, threonine, lysine, leucine, iso-leucine, serine, valine, histidine, cysteine and cystine or a salt thereof. Cysteine and cystine may of course serve in the reaction as sulphur-containing compounds according to the invention.

It is also possible to include in the reaction mixture as an optional ingredient a monosaccharide or a carbohydrate which is capable of being hydrolysed to a monosaccharide under the conditions of the reaction. The most suitable monosaccharides are hexoses, such as glucose, and pentoses, such as ribose, xylose, rhamnose and arabinose.

It is also possible to conduct the reaction in the presence of $C_{12}$–$C_{18}$ aliphatic fatty acid, for example, palmitic acid or oleic acid or a salt, ester or glyceride thereof.

The proportions of the ketone to hydrogen sulphide or sulphur-containing compound which are present in the reaction mixture may vary widely. Thus it is possible to use proportions on a weight basis of from 1 part ketone and 50 parts hydrogen sulphide or sulphur-containing compound to 50 parts ketone and 1 part hydrogen sulphide or sulphur-containing compound. Preferred weight proportions are between 1 part ketone and 10 parts hydrogen sulphide or sulphur-containing compound to 10 parts ketone and 1 part hydrogen sulphide or sulphur-containing compound.

Where the reaction conditions are such that excess hydrogen sulphide remains after the reaction is complete, it is advisable to allow the reactants to stand, or to apply ventilation or other means to remove the excess hydrogen sulphide, otherwise the flavour substance may be objectionable due to residual hydrogen sulphide.

The reaction should be conducted under conditions in which at least a trace amount of water is present in the reaction mixture; suitably the amount of water present should be at least equal by weight to the amount of hydrogen sulphide or the sulphur-containing compound. It is however preferred for reasons of convenience that the weight of water should be at least equal to that of the reactants, so that intimate mixing of the ingredients is thereby facilitated. In general it is not necessary that the weight of water present should exceed 100 times that of the reactants, primarily to facilitate subsequent concentration of the flavouring substances which are the products of the reaction. It is also possible to conduct the reaction where the water is bound in the form of water of crystallisation. As an example, sodium sulphide nonahydrate may be employed in the reaction to act both as a sulphur containing compound and as a source of water.

The rate at which the ketone and hydrogen sulphide or sulphur-containing compound react is dependent on the temperature of the reaction mixture, higher temperatures in general resulting in a faster rate of reaction. However, we have found that it is possible to obtain the flavour substances according to the invention by employing a reaction temperature of between 0° and 150°C, but for practical purposes it is preferred and is more convenient to employ a temperature in excess of 60°C, and most preferably between about 90°C and 110°C. This is particularly applicable when the reaction is carried out by refluxing at atmospheric pressure.

It is necessary to apply a pressure above that of atmospheric pressure when aqueous systems are heated at a temperature above the boiling point of the system at atmospheric pressure. It has also been found advantageous to employ superatomospheric pressure when one of the reactants is a gas, for example when gaseous hydrogen sulphide is employed.

When the reaction is conducted in the presence of more than a trace amount of water, the pH of the reaction mixture may vary over a wide range of values. The reaction thus may be conducted at pH values ranging from 2 to 10, but values between 4 and 7 are preferred.

The duration of the reaction may vary considerably and is, of course, dependent on other parameters which control the rate of reaction. We have, for example, found that the flavour substances are produced within a few minutes of commencing the reaction and continue to build up in the reaction mixture for several days. As a general guide, we have found that for a reaction temperature of 100°C, a reasonable reaction time is from 1 minute to 15 hours, whereas at room temperature, the flavour composition may be produced in as little as 3 minutes to as long as 30 days. It is, however, preferred to restrict the reaction time to between 1 and 6 hours.

According to a preferred embodiment of the invention, a ketone and a sulphur-containing compound giving rise to hydrogen sulphide are reacted together in the presence of water by boiling or simmering under reflux at a temperature slightly in excess of 100°C for about 3 hours. The aqueous reaction mixture may subsequently be concentrated to a paste or dried to powder, care being taken to ensure that the loss of volatile components of the flavouring substance so produced is kept to a minimum.

The flavouring substances prepared according to the invention may thus be employed in liquid or semi-liquid form, for example as solutions, emulsions or pastes, or in dried form, for example as a powder. Drying of the reaction products may be accomplished for example by freeze-drying which has been found to be most suitable for optimum retention of flavour volatiles.

The flavouring substances thus prepared may be blended with a further quantity of a ketone as herein defined, which itself is capable of imparting a savoury taste to a foodstuff, or with one or more compounds from the following classes of substances:

I. Amino acids which may be obtained by hydrolysis, autolysis or fermentation or by combination of these from vegetable or animal proteins such as gluten, casein, soyabean protein and the like.

II. Nucleotides, such as adenosine-5'-monophosphate, guanosine-5'-monophosphate, inosine-5'-monophosphate, xanthosine-5'-monophosphate, uridine-5'-monophosphate, cytidine-5'-monophosphate, or their amides, desoxy derivatives or their salts. Combinations of nucleotides, for example guanosine-5'-monophosphate and inosine-5-monophosphate are particularly suitable.

III. Carboxylic acids such as lactic acid, glycolic acid and γ-hydroxy butyric acid on one hand and dicarboxylic acids such as succinic acid and glutaric acid on the other hand, and especially mixtures of carboxylic acids in which succinic acid and lactic acid occur in weight ratios of 1:30 to 1:150.

IV. Pyrrolidone carboxylic acid or precursors thereof.

V. Peptides such as alanyl-alanine, alanyl-phenylalanine, alanyl-asparagine, carnosine and anserine.

VI. Sweetening substances, both artificial, such as saccharine and cyclamate, and natural, particularly mono- and disaccharides.

VII. Substances with the flavour of cooked or roast meat or of meat broth, (other than those which result from the reaction of a ketone with a sulphur-containing compound as hereinbefore defined), for example the reaction products of amino acids such as cysteine or cystine with reducing sugars, or ascorbic acid, or the reaction products of hydrogen sulphide with lower aliphatic aldehydes and ketones, such as propionaldehyde, crotonaldehyde, methional, mercaptoacetaldehyde.

VIII. Volatile sulphur compounds, such as hydrogen sulphides, mercaptans, disulphides and sulphides, such as dimethyl sulphide and diallyl sulphide.

IX. Guanidines, such as creatine and creatinine.

X. Salts such as sodium chloride, disodium hydrogen phosphate, monosodium dihydrogen phosphate or other alkali or ammonium phosphates and organic phosphates, such as phosphorus-containing amino acids.

XI. Nitrogen-containing compounds, such as ammonia, amines, urea, indole and skatole.

XII. Saturated or unsaturated carboxylic acids for example those containing from 2 to 12 carbon atoms in the molecule.

XIII. Saturated or unsaturated higher hydroxycarboxylic acids and γ and δ-lactones derived therefrom, such deca- and dodeca-5-olide and 2,3-dimethyl-2,4-alkadiene-4-olides.

XIV. Lower saturated and unsaturated aldehydes, for example acetaldehyde, propion-aldehyde, iso-butyraldehyde and hepten-4-al.

XV. Lower saturated and unsaturated ketones, such as acetone, butanone and diacetyl.

XVI. Tricholomic acid and biotenic acid or their salts.

XVII. Aromatic and/or heterocyclic compounds, such as ortho amino-acetophenone, N-acetonyl pyrrole, iso-maltol, lenthionine, hypoxanthine, guanine, inosine and guanosine.

XVIII. Lower saturated and unsaturated alcohols, such as ethanol and octanol.

XIX. Colouring substances, such as curcuma and caramel.

XX. Thickening agents such as gelatin and starch.

XXI. Unsaturated $C_{12}$–$C_{18}$ aliphatic fatty acids and their glycerides or saturated glycerides.

The proportions of these optimally added substances used is dependent on the kind of flavour desired and also on the nature of the foodstuff to which they are added together with other ingredients, such as herbs and spices. In addition to preparing flavouring substances for subsequent addition for foodstuffs, by reacting together a ketone and hydrogen sulphide as herein described, it is also possible to add the unreacted starting materials to the foodstuff so that the flavouring substances may subsequently develop in the foodstuff before consumption. Thus, for example, it is possible to add a ketone and a sulphur-containing compound capable of producing hydrogen sulphide to the ingredients of a soup which is subsequently canned and heat sterilised. A desirable roast meat-like flavour may thereby be developed within the soup after heat sterilisation in the sealed can.

The flavouring substances prepared according to the invention may otherwise be incorporated into foodstuffs, such as soups, sausage, reformed comminuted meat, simulated meat products, such as textured vegetable protein, and pastry products, in an amount sufficient to impart or enhance the desired flavour. Thus, flavouring amounts will vary according to the individual palate and according to the nature of the foodstuffs. As a general guide, the flavouring substances in amounts of from 1 ppm to 8,000 ppm have been incorporated in foodstuffs, these proportions being expressed on a weight basis.

As an illustration of suitable quantities of the flavouring substances that may be added to specified types of foodstuff, we have found that as little as 1 ppm to 10 ppm w/w is sufficient to impart a pleasant roast meat flavour to soups which are bland or otherwise lightly flavoured. On the other hand, when incorporating a similar roast meat flavour to already flavoured foodstuffs such as those based on vegetable protein, it may be necessary to incorporate larger amounts, for example from 600 to 8,000 ppm w/w of the flavouring substance in order to obtain a desirable flavour.

When the flavour substances prepared according to the invention are added to a foodstuff, it is believed that further reaction in situ in the foodstuff contributes to the development of the desired flavour characteristic. It would thus appear likely, for example, that sulphydryl groupings present in or derived from protein present in the foodstuff react further with the ketone derivatives in the flavour substance to produce compounds having improved flavour properties.

The invention is illustrated by the following examples.

EXAMPLE 1

A beef flavoured composition was prepared by adding 250 ml of water to a mixture of 5.7g of 4-hydroxy-5-methyl-2,3-dihydrofuran-3-one and 25.0g of cysteine and heating the mixture at about 100°C for 2½ hours. The resulting mixture was cooled and quantities of between 0.2 and 2.0 ml of the reaction mixture were sprayed over 100g portions of dehydrated textured vegetable protein containing no meat. An excellent roast meat flavour was thereby imparted to this material as assessed by 11 out of a total panel of 12 expert tasters.

Dextrin-maltose was added to a portion of the flavoured mixture which resulted from the reaction described above in an amount which provided a composition containing about 70 parts by weight of dextrin-maltose to each part of the substance calculated on a solid basis. The composition was freeze dried and a beef flavoured product was obtained.

EXAMPLE 2

To 6.4g of 4-hydroxy-2,5-dimethyl-2,3-dihydrofuran-3-one in a buffer solution containing about 35g sodium acetate, about 14g of acetic acid and 400 ml of water (pH 5.0), a solution of 12g of sodium sulphide ($Na_2S.9H_2O$) in 200 ml of water was added over a period of 30 minutes. The mixture was then boiled under reflux conditions at atmospheric pressure for 2 hours and allowed to cool. The pH was then 6.6. The reaction mixture so obtained had a good roasted meat flavour.

EXAMPLE 3

A mixture of 7.2g of 4-hydroxy-2-hydroxymethyl-5-methyl-2,3-dihydrofuran-3-one, 12g of sodium sulphide ($Na_2S.9H_2O$) and 300 ml of water was heated in a round-bottomed flask fitted with reflux condenser for 2 hours at a temperature of 110°C. The reflux condenser was then removed and the contents cooled to room temperature. The resulting solution had a taste resembling that of roasted meat.

EXAMPLE 4

6.3g of 3-hydroxy-2-methyl-1,4-pyrone, 3.8g of thioacetamide and 100 ml of water were heated together in a round-bottomed flask at 100°C for 2½ hours. The reaction mixture was then allowed to cool (pH 4.3) and it was shown to have an excellent roast beef flavour.

EXAMPLE 5

A roast beef-flavoured composition was prepared by adding 200 ml of water to a mixture of 7.0g of 3-hydroxy-2-ethyl-1,4-pyrone and 4.6g of mercaptoacetamide and heating the mixture to 100°C for 5 hours. A product having a good roasted meat flavour was obtained. Before use in conjunction with the foodstuff, the pH was adjusted to 5.5 by the addition of sodium hydroxide solution.

EXAMPLE 6

0.5g of hydrogen sulphide gas was dissolved in 100 ml of water. To this solution was added 5.0g of 4-hydroxy-5-methyl-2,3-dihydrofuran-3-one. The mixture was then heated in an autoclave for 2 hours at 100°C and allowed to cool. A meat-like flavour was developed as a result of this reaction.

EXAMPLE 7

3.0g of a 70/30 mixture of 4-hydroxy-2-methyl-5-ethyl-2,3-dihydrofuran-3-one and 4-hydroxy-5-methyl-2-ethyl-2,3-dihydrofuran-3-one, 9.0g of cysteine and 60 ml of water were heated in a round bottomed flask fitted with reflux condenser for 2 hours at 100°C. The reflux condenser was then removed and the contents cooled to room temperature. The resulting solution had a good roasted meat flavour.

EXAMPLE 8

A composition with a meat-like flavour was prepared by adding 100 ml of water to a mixture of 4.0g of 4-hydroxy-2,5-diethyl-2,3-dihydrofuran-3-one and 20.0g of cysteine and heating the mixture at 95°–100°C for 4 hours.

EXAMPLE 9

A mixture of 1.5g of 4-hydroxy-5-methyl-2,3-dihydrofuran-3-one and 1.5g of cysteinein 30 ml of water was heated at about 100°C for 2½ hours. To the resulting solution was added 33g of malto-dextrin. The solution thus obtained was carefully freeze dried. The powder obtained was used as a good beef flavour in soup or gravy.

EXAMPLE 10

A gravy was prepared from the following ingredients:

|                        | grams |
|------------------------|-------|
| potato starch          | 15    |
| onion powder           | 2.5   |
| monosodium glutamate   | 3     |
| beef tallow            | 20    |
| flour                  | 15    |
| caramel                | 1.6   |
| pepper                 | 0.02  |
| bayleaves              | 0.02  |
| clove                  | 0.02  |
| sodium chloride        | 8     |
| protein hydrolysate    | 4     |
| beef extract powder    | 2     |
| tomato powder          | 1     |
|                        | 72.16 |

The potato starch and flour were added to the molten beef tallow at 60°C under continuous stirring. The other ingredients were well blended and likewise added to the beef tallow. The whole mixture was boiled in 1 litre of water.

The gravy so obtained was divided into two portions of 500 ml. In the first portion 250mg of malto-dextrin was dissolved in the second portion 250mg of the flavour powder prepared according to Example 9. Both gravies were assessed in a paired comparison test by a panel consisting of 12 persons.

The gravy containing the flavour powder was preferred by 10 out of the 12 tasters because of its more pronounced fried meat flavour.

EXAMPLE 11

A basic composition for a dry beef soup was obtained by mixing the following ingredients:

|                        | grams |
|------------------------|-------|
| onion powder           | 0.5   |
| spice mix              | 0.5   |
| fat                    | 4     |
| dried soup vegetables  | 1     |
| MSG                    | 2     |
| modified potato starch | 3     |
| noodles                | 20    |
| salt                   | 8     |

One litre of water was added to the mixture and the whole was boiled for 5 minutes. The soup so obtained was divided in two portions of 500 ml. In the first portion 150 mg of malto-dextrin was dissolved and in the section portion 150 mg of the flavour powder prepared according to example 9.

Both soups were assessed in a paired comparison test by a panel consisting of 8 persons. The soup containing the flavour powder had a characteristic beef flavour and was preferred by 7 out of the 8 tasters.

EXAMPLE 12

6.3g of 3-hydroxy-2-methyl-1,4-pyrone, 10.5g of sodium sulphide ($Na_2S9H_2O$) and 100 ml of water were heated together in a round-bottomed flask at 100°C for 2½ hours.

To the reaction mixture was added 117g of malto-dextrin. The resulting solution was spray-dried immediately. The powder thus obtained proved to have a good beef flavour.

EXAMPLE 13

1 litre gravy was prepared according to the method described in Example 10. This gravy was divided into two portions of 500 ml each. To the first portion 125mg of malto-dextrin was added and to the second portion 125mg of the flavour powder prepared according to Example 12. Subsequently both gravies were boiled for 5 minutes and judged afterwards by a panel consisting of 9 expert tasters. Of these, 7 persons preferred the gravy with the aroma powder, while the other 2 expressed no preference. A fuller flavour and a more meaty taste were given as reasons for the preference.

EXAMPLE 14

100g of textured vegetable protein (T.V.P.) was boiled for 15 minutes in 500 ml of water together with:

|                                                    | grams |
|----------------------------------------------------|-------|
| MSG                                                | 1.85  |
| Salt                                               | 4.0   |
| protein hydrolysate                                | 1.1   |
| spices                                             | 0.45  |
| flavour powder prepared according to Example 12    | 6.0   |

The T.V.P. thus obtained was compared with the product in which the flavour powder was repaced by 6.0g of malto-dextrin. Both T.V.P. products were assessed in a paired comparison test. The product with the flavour powder was generally preferred. A fuller flavour and a more meaty taste were given as reasons for this preference.

EXAMPLE 15

5.0g of 4-hydroxy-2,5-dimethyl-2,3-dihydrofuran-3-one, 0.5g of hydrogen sulphide and 100 ml of water were placed in an autoclave and heated for 2 hours at 100°C. To the resulting solution was added 100g of matlo-dextrin. The solution thus obtained was carefully freeze dried. The powder obtained was used as a beef flavour in soup.

EXAMPLE 16

Minced meat was prepared from the following ingredients:

|                | grams |
|----------------|-------|
| sausage meat   | 825   |
| salt           | 10    |
| whole egg      | 82.5  |
| bread-crumbs   | 82.5  |
|                | 1000  |

The minced meat so obtained was divided into two portions of 500g each. To the first portion was added a mixture of 10g of bread-crumbs and 0.25g malto-dextrin, and to the second portion a mixture of 10g of bread-crumbs and 0.25g of the flavour powder prepared according to Example 15. Meat balls prepared from each portion were fried in margarine for 30 minutes. The meat balls of both portions were assessed in a paired comparison test by a panel consisting of 8 persons. A unanimous preference was shown for the meat balls containing the flavour powder, because of the more pronounced fried meat flavour.

EXAMPLE 17

1.6g of 4-hydroxy-2,5-dimethyl-2,3-dihydrofuran-3-one, 8.0g of glutathione and 50 ml of water were heated for 1½ hours at 100°C in a round-bottomed flask fitted with a reflux condenser. To the resulting solution was added 5.0g cysteine, and the mixture was again heated for 2 hours at 100°C. The resulting solution had a good roasted meat flavour.

EXAMPLE 18

A basis for canned beef soup was prepared by adding the following ingredients to 4 litres of water:

|  | grams |
|---|---|
| noodles | 160 |
| herbs and spices | 1.6 |
| tallow | 80 |
| vegetables | 400 |
| MSG | 16 |
| protein hydrolysate | 16 |
| meat extract | 16 |
| salt | 64 |
| raw meat | 400 |

The total amount was divided into two portions, each of 2 litres. 1.4g of the flavoured solution prepared according to Example 17 was added to one of the portions. The second portion which was used without further addition, served as a control. The mixtures thus obtained were canned in half litre tins and sterilised in an autoclave. A soup ready for consumption was prepared by adding to the contents of each tin an equal volume of water. After heating, both soups were served to a panel consisting of 19 people for organoleptic testing. The soup with the flavour solution was preferred by 15 persons, because of its more meaty flavour.

EXAMPLE 19

One litre of gravy was prepared according to the method described in Example 10. This gravy was divided into two portions of 500 ml each. To one of the portions was added 0.2g of the flavoured solution obtained in Example 17, while the other was used without further addition. Both gravies were judged by a panel consisting of 9 persons. Of these 8 persons preferred the gravy with the flavour solution. A more meaty taste and a fuller flavour were given as reasons for the preference.

EXAMPLE 20

A mixture of 4g of powdered casein hydrolysate, 2g of cysteine, 1g of xylose, 1g of 4-hydroxy-5-methyl-2,3-dihydrofuran-3-one and 50 ml of water was heated in a flask with stirring for 2½ hours at 95°C. The solution thus obtained proved to have a good beef flavour.

EXAMPLE 21

One litre of gravy was prepared according to the method described in Example 10. This gravy was divided into two portions of 500 ml each. To the first portion was added 0.5g of the flavoured solution prepared according to Example 20, and to the second portion, 0.5g of a solution prepared according to the method described in Example 20 except that the 1g of 4-hydroxy-2,3-dihydrofuran-3-one had been omitted. Both gravies were assessed in a paired comparison test by a panel consisting of 9 persons. The gravy portion containing the flavoured solution prepared using all the ingredients of Example 20 was significantly preferred because of its more pronounced meat flavour.

EXAMPLE 22

One litre of gravy was prepared according to the method described in Example 10. The gravy was divided into two portions of 500 ml each. To the first portion was added 250mg of the flavour powder prepared according to the method described in Example 9, and to the second portion was added 12.5mg of 4-hydroxy-5-methyl-2,3-dihydrofuran-3-one. Both gravies were assessed in a paired comparison test by a panel consisting of 16 expert tasters. The gravy containing the flavour powder was preferred by 12 out of 16 persons because of its more pronounced fried meat flavour.

EXAMPLE 23

A mixture of 1.0g of 4-acetoxy-5-methyl-2,3-dihydrofuran-3-one, 2.0g of thioacetamide and 20ml of water were heated together in a round bottomed flask at 100°C for 4 hours. The reaction mixtured was then allowed to cool. It had a good roast beef flavour.

EXAMPLE 24

A mixture of 1.0g of 4-methoxy-2,5-dimethyl-2,3-dihydrofuran-3-one and 4.0g of cysteine in 10ml of water was heated at about 100°C for 6 hours. The solution thus obtained had a good roasted meat flavour.

What is claimed is:

1. A process for the preparation of a flavor substan comprising reacting at a temperature of 0°–150°C a heterocyclic ketone having the structure:

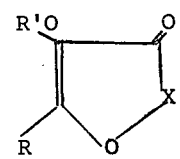

where X is selected from the groupings:

$CH_2$, $CHCH_3$, $CHCH_2CH_3$ or $CHCH_2OH$, and where R is a radical selected from the group consisting of alkyl radicals having from 1 to 4 carbon atoms, and where $R^1$ is a radical selected from the group consisting of hydrogen, a hydrocarbon acyl radical having from 2 to 7 carbon atoms and an alkyl radical having from 1 to 4 carbon atoms, in the presence of water with a hydrogen sulphide liberating compound selected from the group consisting of hydrogen sulphide, cysteine, cysteine containing peptide, cystine mercaptoacetamide, thiocetamide, their salts or esters, alkali metal, alkaline earth metal and ammonium sulphides or hydrosulphides wherein the weight ratio of ketone to hydrogen sulphide is between 1 : 10 and 10 : 1.

2. A process according to claim 1, in which the ketone is selected from the group consisting of:
4-hydroxy-5-methyl-2,3-dihydrofuran-3-one
4-hydroxy-2,5-dimethyl-2,3-dihydrofuran-3-one
4-hydroxy-2-methyl-5-ethyl-2,3-dihydrofuran-3-one
4-hydroxy-5-methyl-2-ethyl-2,3-dihydrofuran-3-one
4-hydroxy-2,5-diethyl-2,3-dihydrofuran-3-one
4-hydroxy-2-hydroxymethyl-5-methyl-2,3-dihydrofuran-3-one 4-acetoxy-5-methyl-2,3-dihydrofuran-3-one
4-methoxy-2,5-dimethyl-2,3-dihydrofuran-3-one.

3. A process according to claim 1, in which the sulphur-containing compound is selected from the group consisting of cysteine, mercaptoacetamide and thioacetamide.

4. A process according to claim 1, in which the sulphur-containing compound is selected from the group consisting of sulphides and hydrosulphides of alkali metals, alkaline earth metals and ammonia.

* * * * *